United States Patent
Zimmer et al.

(10) Patent No.: US 9,089,938 B2
(45) Date of Patent: Jul. 28, 2015

(54) FRICTIONAL ENGAGEMENT MECHANISM FOR A RAIL-GUIDED CARRIAGE

(76) Inventors: Günther Zimmer, Rheinau (DE); Martin Zimmer, Rheinau (DE)

( * ) Notice: Subject to any disclaimer, the term of this patent is extended or adjusted under 35 U.S.C. 154(b) by 66 days.

(21) Appl. No.: 13/136,881

(22) Filed: Aug. 13, 2011

(65) Prior Publication Data

US 2012/0031713 A1 Feb. 9, 2012

Related U.S. Application Data

(63) Continuation-in-part of application No. PCT/DE2010/000167, filed on Feb. 12, 2010.

(30) Foreign Application Priority Data

Feb. 13, 2009 (DE) .......................... 10 2009 008 815

(51) Int. Cl.
| | | |
|---|---|---|
| F16C 29/10 | (2006.01) | |
| B23Q 1/28 | (2006.01) | |
| F16D 63/00 | (2006.01) | |
| F16D 121/02 | (2012.01) | |
| F16D 121/12 | (2012.01) | |
| F16D 125/66 | (2012.01) | |

(52) U.S. Cl.
CPC ................ B23Q 1/28 (2013.01); F16D 63/008 (2013.01); *F16D 2121/02* (2013.01); *F16D 2121/12* (2013.01); *F16D 2125/66* (2013.01)

(58) Field of Classification Search
CPC .............. F16D 2125/66; F16D 63/008; F16D 2121/12; B23Q 1/28

USPC ............ 188/41, 42, 43, 106 F, 107, 153, 170, 188/153 R
See application file for complete search history.

(56) References Cited

U.S. PATENT DOCUMENTS

| | | | | |
|---|---|---|---|---|
| 6,119,832 A | * | 9/2000 | Hofmann .................. | 188/322.13 |
| 6,578,677 B2 | * | 6/2003 | Hsu et al. .......................... | 188/43 |
| 7,051,843 B2 | * | 5/2006 | Zimmer et al. .................. | 188/67 |
| 2005/0183907 A1 | | 8/2005 | Maher | |

FOREIGN PATENT DOCUMENTS

| | | | |
|---|---|---|---|
| DE | 20202803 U1 * | 7/2003 | |
| WO | WO 2006063566 A1 * | 6/2006 | |
| WO | WO 2006097083 A1 * | 9/2006 | |
| WO | WO 2006108387 A1 * | 10/2006 | F15B 15/26 |

* cited by examiner

*Primary Examiner* — Bradley King
*Assistant Examiner* — Stephen Bowes
(74) *Attorney, Agent, or Firm* — Klaus J. Bach

(57) ABSTRACT

In a frictional engagement arrangement for a carriage supported on, and guided by, at least one guide track and provided with a friction engagement mechanism actuated by a slide wedge drive which includes a pressure member which is engageable with the guide track, the slide wedge drive includes an operating mechanism which is arranged in a multistep through bore extending in parallel with the longitudinal extent of the guide track with the pressure member and a slide wedge cage movably disposed in a bore extending normal to the multi-step through bore.

7 Claims, 5 Drawing Sheets

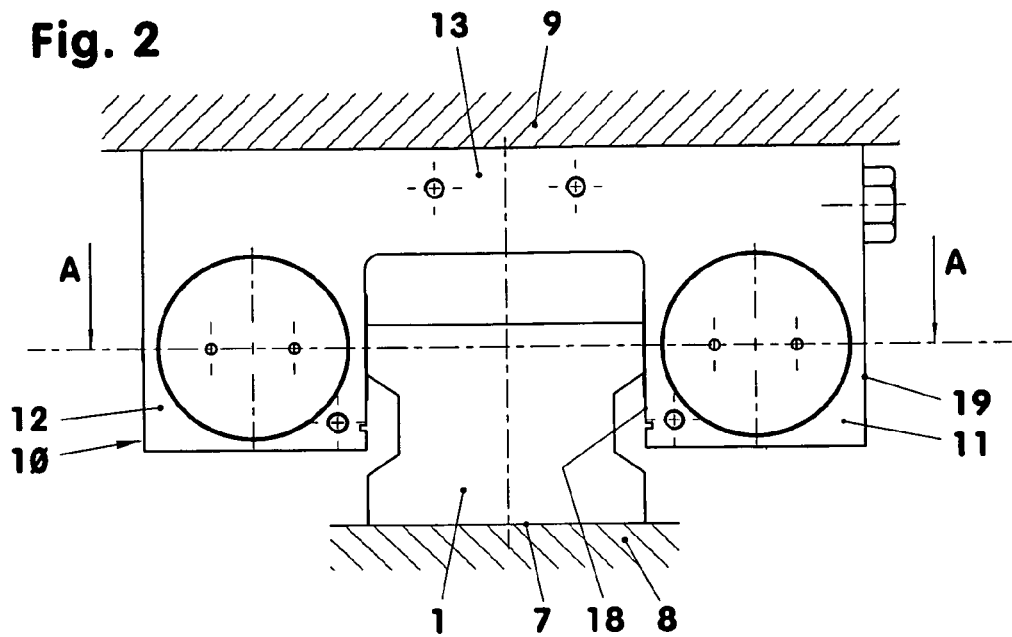
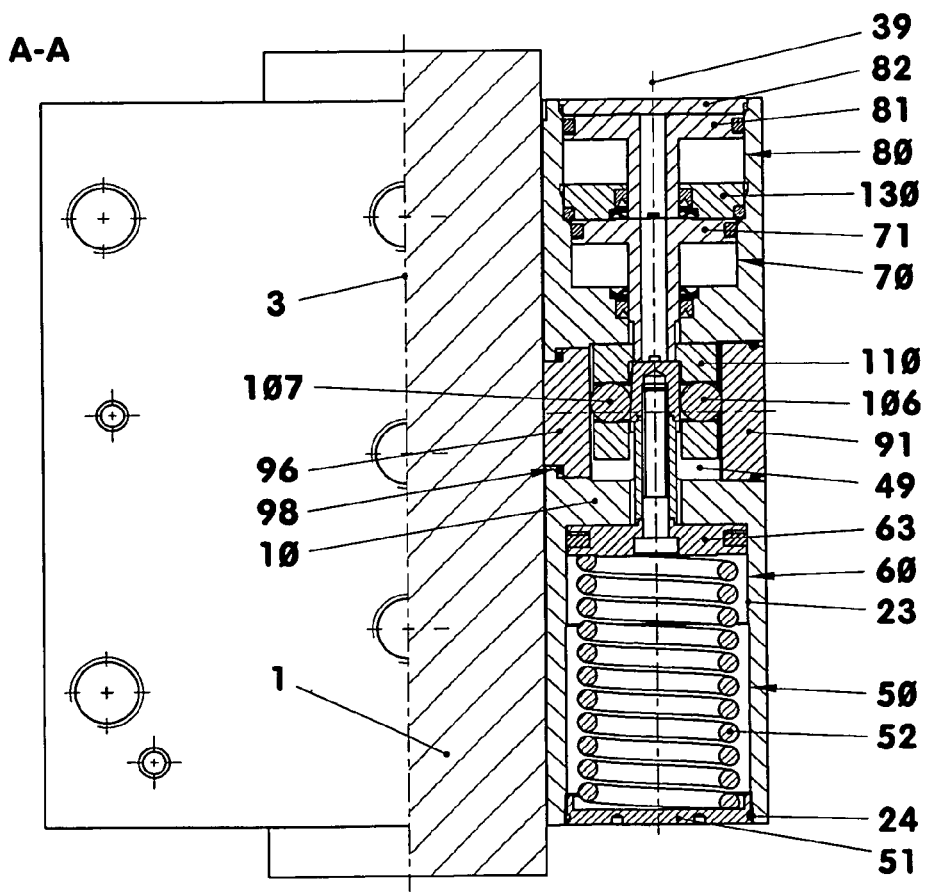

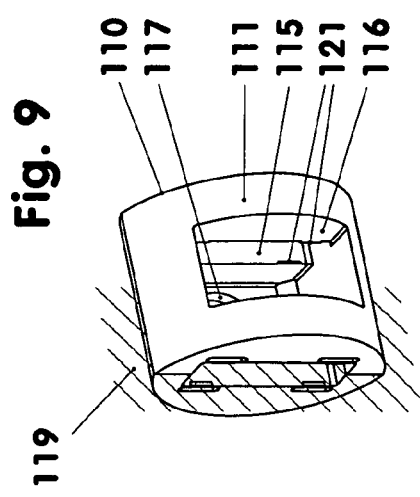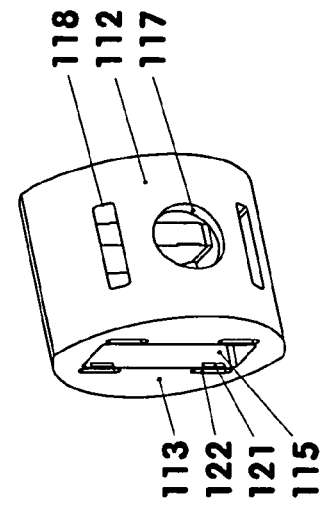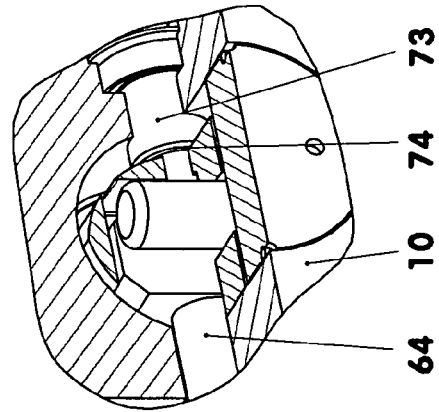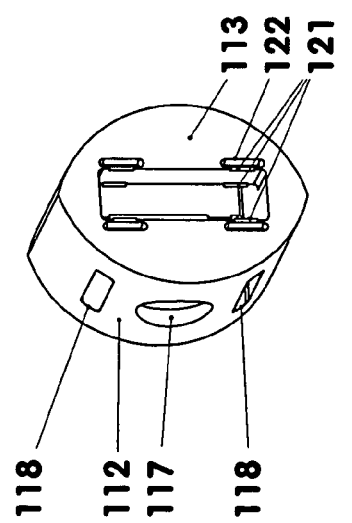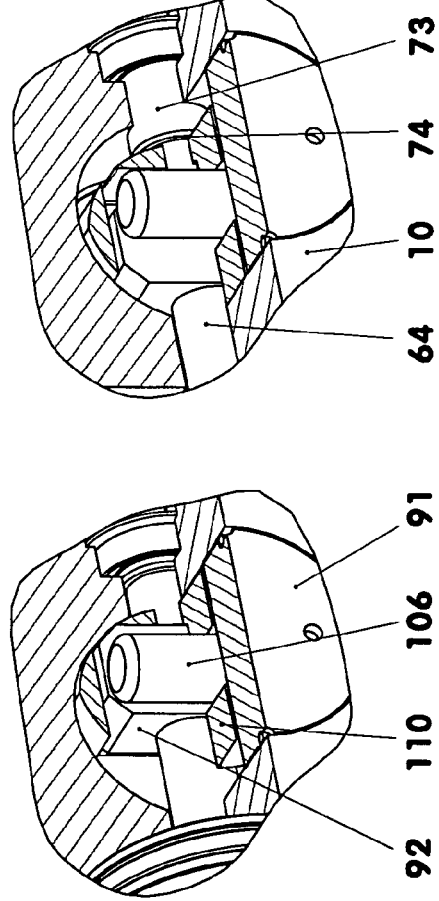

US 9,089,938 B2

FRICTIONAL ENGAGEMENT MECHANISM FOR A RAIL-GUIDED CARRIAGE

This is a Continuation-In-Part application of pending international patent application PCT/DE2010/000167 filed Feb. 12, 2010 and claiming the priority of German patent application 10 2009 008 815.8 filed Feb. 13, 2009.

BACKGROUND OF THE INVENTION

The invention resides in a frictional engagement mechanism, that is a braking or locking arrangement for use in connection with a carriage guided by at least one guide rail wherein the arrangement comprises at least one frictional engagement structure which is operable by means of a sliding wedge drive. The wedge drive includes at least a pressure member, which is supported in a housing and which can be pressed against the guide rail. For engaging the frictional braking or clamping arrangement, the slide wedge drive is moved by a spring force and/or a pneumatic or hydraulic pressure force in one direction and for releasing, it is moved by a pneumatic or hydraulic pressure force of at least one piston in the opposite direction. The piston or pistons are arranged in at least one multistage through bore whose center line is oriented parallel to the longitudinal guide rail direction. The slide wedge of the slide wedge drive acts via at least one roller body on a pressure member and the roller body or bodies are supported in a cage which is displaceable in the longitudinal guide rail direction of the piston or pistons.

DE 102 07 605 C1 and DE 2000 2915U1 disclose such a brake- and/or clamping arrangement. Herein the cage, in which, among others, the roll members of the slide wedge drive are supported, is disposed in alignment with at least one for example, pneumatically operated cylinder-piston unit.

US 2005/0183907 A1 discloses a brake and/or clamping arrangement wherein the force of two drives of the arrangement is redirected by two opposite wedge drives to provide a clamping force effective on a guide rail. Each wedge drive includes a slide wedge, which carries at each support flank two ball bearings. The single slide wedge is guided in a slot of the respective pressure member.

It is the object of the present invention to provide a braking and/or clamping arrangement with a high clamping force and high form stability but which requires relatively little space and little servicing while it is easy and safe to handle and which operates fast and almost without any wear.

SUMMARY OF THE INVENTION

In a frictional engagement arrangement for a carriage supported on, and guided by, at least one guide track and provided with a frictional engagement mechanism actuated by a slide wedge drive which includes a pressure member which is engageable with the guide track, the slide wedge drive includes an operating mechanism which is arranged in a multistep through-bore extending in parallel with the longitudinal extent of the guide track with a pressure member and a slide wedge cage movably disposed in a bore extending normal to the multi-step through bore.

Herein the cage is mounted in a housing bore which extends transverse to longitudinal guide rail direction and which is intersected by a connecting bore which is part of the through bore. The connecting bore has a diameter of less than 30% of the diameter of a spring accommodation bore which is part of the through bore.

The braking and/or clamping arrangement comprises at least one friction engagement mechanism and at least one for example two-dimensional planar slide wedge drive. The frictional engagement mechanism acts via a pressure member on a guide rail on which a machine or measuring apparatus carriage is supported and guided which carries the arrangement. The frictional engagement mechanism generates its braking and clamping effects by the release of spring energy which is stored in a spring storage device and which is transferred via the slide wedge drive to the respective pressure member. In the particular design, the respective cage is installed transversely to the longitudinal guide direction and parallel to the clamping direction within the bore in which also the respective pressure member is mounted. With the component orientation, the slide wedge disposed in the cage can be moved through the housing bore whose diameter is only slightly larger than the respective outer diameter of the piston rod which moves the slide wedge.

In the exemplary embodiments a slide wedge for a friction engagement mechanism is provided for each housing side of the arrangement. Each slide wedge is held in position by three pneumatically operated pistons against the effect of a spring storage device, wherein the pressure members or the friction pads do not abut the guide rail. The number of pistons can be increased or reduced depending on the required brake force. Also, two or more slide wedge drives may be arranged in a row at each housing side which drives act on the same frictional engagement mechanism. The number of pistons used may remain the same or it may be changed.

The guide rails on which the pressure mechanism abut may have for example prism shaped, rectangular, round oval or polygon-shaped cross-sections. Also, the friction pairings may not be limited to linear guide arrangements. Instead of the guide rails mentioned spatially curved rails may be used.

The invention will become more readily apparent from the following description of schematically shown embodiments.

BRIEF DESCRIPTION OF THE DRAWINGS

FIG. 2 is a front view of the arrangement including the guide rail,

FIG. 3 is a partial sectional view taken along line A-A of FIG. 2,

FIG. 6 is a perspective sectional view of a section of the slide wedge drive with the friction engagement mechanism activated, FIG. 7 is a view—like FIG. 6—with the friction engagement mechanism deactivated, FIG. 8 is a perspective side view of a wedge drive cage, FIG. 9 is a perspective front view of the cage, FIG. 10 is a perspective rear view of the cage.

DESCRIPTION OF EXEMPLARY EMBODIMENTS

Figure 1:
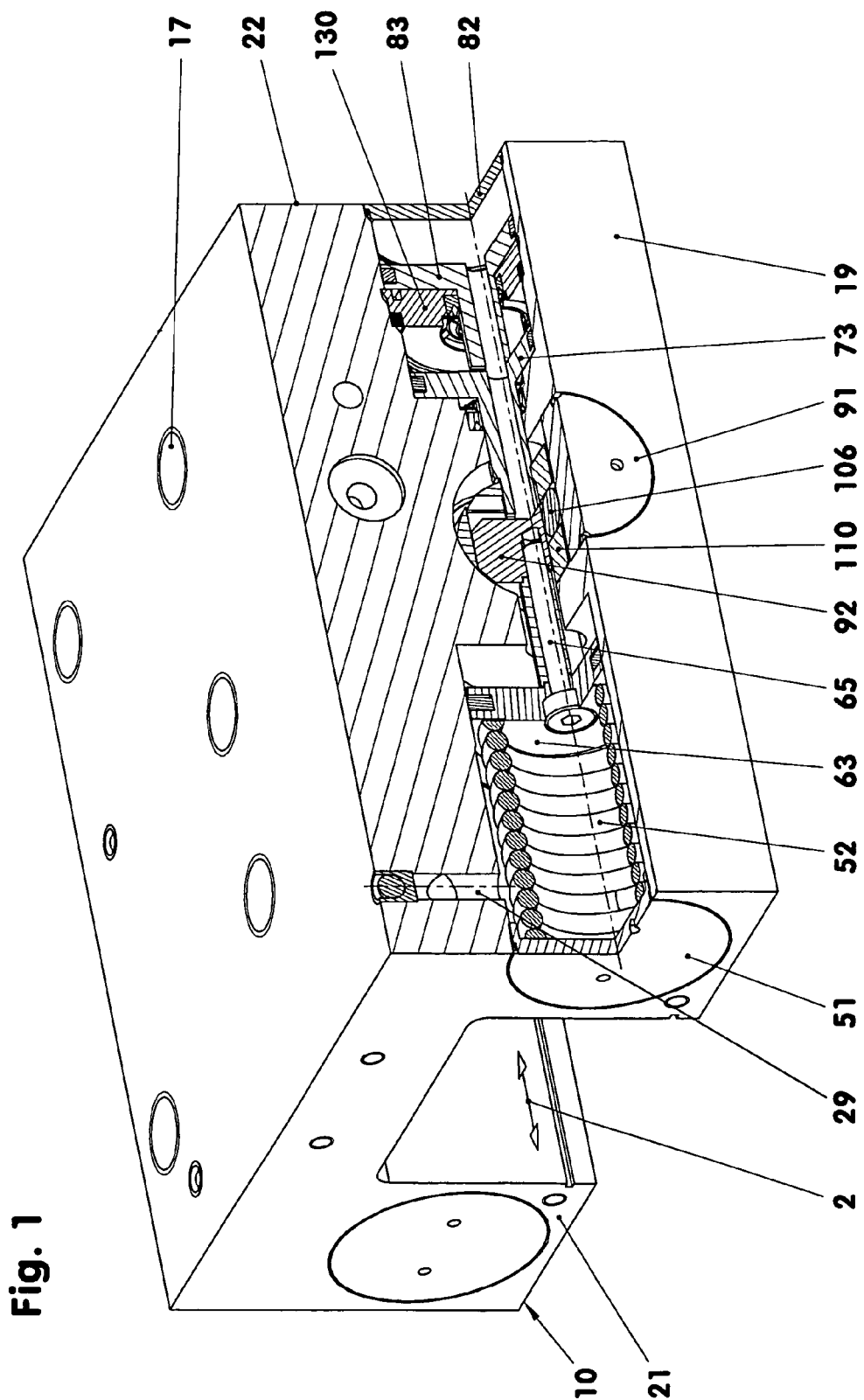
FIG. 1 shows a frictional engagement arrangement in a partially sectional view.

FIG. 1 shows a brake and/or clamping arrangement as it is used for example in many horizontally or vertically movable carriages among others in connection with tools or measuring machines. The arrangement is disposed on a carriage 9 in such a way that it extends around a guide rail 1—determining the longitudinal carriage direction—for example, in each case with two friction engagement mechanisms 90. Each friction engagement mechanism is acted on by a slide wedge 92 which is acted on by at least one spring storage drive 50 and which is relieved by at least one pneumatic drive 70, 80.

In FIGS. 2 and 3, a section of a double-prismatic guide rail 1 is shown. The guide rail 1 consists of a rod with an approximately square envelope cross-section, into which an essentially V-shaped groove with a widened bottom area is machined. Via its bottom wall 7, the rail is in contact for example with a machine bed by which it is supported.

The guide rail 1 is surrounded at both sides by a housing 10. The housing 10 includes integrated therein two arrangements for generating braking and clamping forces. In principle, the C-shaped housing 10 comprises a parallelepiped block with a longitudinally extending engagement groove 14 which has a rectangular cross-section. In the space formed by the groove 14, the guide rail 1 is accommodated. The groove is for example slightly wider than the guide rail in the area which is surrounded by the housing 10.

According to FIG. 2, the housing 10 has, for example in a direction transverse to the guide rail direction, an over-all width which is about three times the width of the guide rail. The overall height of the housing 10 is for example 150% of the height of the guide rail. The length of the housing 10 in the drawing plane of FIG. 3 corresponds for example to the width of the housing.

The housing 10 has a left and a right housing zone 11, 12. Both zones 11, 12 are below a flange zone 13. Each housing zone 11, 12 includes a multi-stepped through bore 23, 34, 77, 87 whose center line 39 extends parallel to the longitudinal guide rail direction 2, see FIG. 9. The through bore comprises a spring storage bore 23, a connecting bore 34 and an outer cylinder surface bore 87.

In the area of the opening of the spring storage bore 23, there is in the area of the front face 21 of the housing 10 a finely threaded area and a groove in which a sealingly compressed ring is disposed. The base for the spring storage bore is planar. In the center of the base, the through bore 23, 34, 77, 87 continues in the form of a connecting bore. The diameter of the connecting bore 34 is less than 30% of the diameter of the spring storage bore 23. Behind the connecting bore 34, there is a cylinder with an inner cylinder-piston unit 70 and the cylinder of an outer cylinder piston unit 80. The cylinder surface of the inner cylinder bore unit 70 has a diameter which is about 80% of the diameter of the spring storage bore 23. The diameter of the cylinder surface bore 87 of the outer cylinder piston unit 87 of the outer cylinder piston unit 80—it ends at the front face 22 of the housing 10—corresponds to the diameter of the spring storage bore 23.

The connecting bore 34 is intersected in its center area by an engagement mechanism bore 41 which delimits a wedge drive chamber 49. The engagement mechanism bore 41 extends transverse to the center line 39. It connects, as a multiply stepped through bore, the outer side wall 19 with the inner wall 18 of the engagement groove 14. It consists mainly of a main bore 42, a pressure member guide bore 44 and an exit bore 45. The main bore whose diameter is here for example 77% of the diameter of the spring storage bore 23 is provided at its outer end area with a fine thread 43 for accommodating an adjustment screw 91.

The adjustment screw 91 is a cylindrical disc which is provided at its outer front face with bores for engagement by a pin wrench. It has an outer thread which ends in an annular groove. In the groove, a compression ring is disposed for securing and sealing purposes.

The pressure member guide bore 44 and the exit bore which has a smaller diameter support the pressure member 96.

The pressure member 98 is a cylindrical piston with a piston rod extending therefrom. The piston rod projects from the exit bore 45 when the friction engagement mechanism is actuated. At the transition between the piston rod and the piston a front groove is provided in which an elastic back stroke ring 98 with for example a rectangular cross-section is disposed, the outer front face of the pressure member 96—it extends into the circumferential groove 14—is for example planar and extends normal to the center line 46. The front face may be provided with a friction coating which is mounted or deposited thereon. The friction coating may also be provided on a friction pad which is separately supported on the housing 10, see DE 102 07 605 C1.

The inner front face 97 is also planar. In the exemplary embodiment, it extends normal to the centerline 46. Alternatively, the inner front face 97 may extend at an angle of for example between 0.5 and 5° with respect to center line 39. The normal line on the front face is inclined toward the compression spring 52 or another spring system provided there.

Between the pressure member 96 and the adjustment screw 91, the cage 110, see FIGS. 6-10, is arranged, which consists of polyoxymethylene (POM). The cage 110 is for example, a spatial body which consists of two cylinder parts of the same size which are joined together. Each cylinder part has the cross-section of a circle section whose arch height is smaller than the radius of the circle. The difference between the arch height and the circle radius corresponds to half the maximum stroke of the cage 110. The difference may be up to 10% greater than half the maximum stroke. The virtual contact plane disposed between cylinder part pieces is called the longitudinal cage center axis 119.

The contact plane or respectively the longitudinal cage center axis 119 may also be an assembly gap where the cylinder part pieces in the form of two separate premanufactured components are joined with, or without, separate mounting means via form-, force- or material connections for example by interlocking cementing screwing, riveting etc.

The cage 110 includes a through channel 115 which extends parallel to the longitudinal cage center axis 119 of an at least approximately rectangular cross-section the trough channel 115 is divided into two halves by the longitudinal cage center axis 119.

Transverse to the longitudinal cage center plane 119, the cage is provided with a slide wedge cavity 116 also of an essentially rectangular cross-section. The slide wedge cavity 116 is machined into the cage 110 from the front side 111 thereof, see FIG. 9. It extends so far into the interior of the cage 110, that it extends from the backside of the cage at two locations. In this way, there, the two at least approximately rectangular windows 118 are formed. Between the windows 118, there is a transverse bore 117 which extends normal to the longitudinal cage center plane 119 and reaches for example centrally the slide wedge cavity 116. The slide wedge cavity 116 and the through channel 115 have for example the same height.

Figure 5:
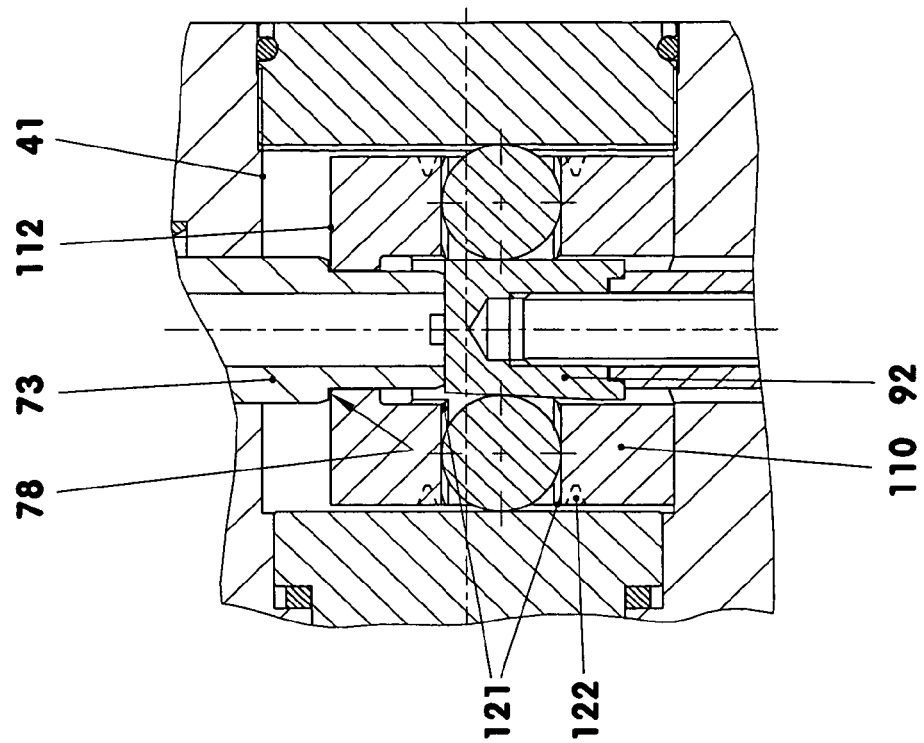
FIG. 5 shows the slide wedge drive with the frictional engagement mechanisms deactivated.

In the outer areas of the through channel 115 as rolling bodies 106, 107 in each case a cylindrical roller see FIGS. 5-7 is arranged. Both cylindrical rollers 106, 107 abut a slide wedge 92 of a slide wedge drive. The slide wedge 92 is supported in the slide wedge cavity 116. The outer cylindrical roller 106 is supported on the adjustment screw 91 whereas the inner cylindrical roller 107 abuts a pressure member. If for example a pressure member 96 is used whose inner planar surface is inclined with regard to the center line 39 at least two cylindrical rollers 107 are placed between the slide wedge 92 and the pressure member 96. In this case, at least two cylindrical rollers 106 are arranged also between the slide wedge 92 and the adjustment screw 91.

At each front side 113 of the cage 110 for example two groove-like engagement cavities 122, see also FIG. 5, are formed at the side edges of the trough channel 115. In the area of each engagement groove 122 projections 121 are formed which extend a few tenth of a millimeter into the through-channel 115. Comparable projections 121 are also formed, see FIGS. 8-10, at the edges formed by the channel 115 and the slide edge cavity 116. The engagement projections 121 retain the cylindrical rollers 106, 107 in place so that they are not lost before the cage 110 is installed.

Similar projections may also be provided in the slide wedge cavity 116 for example in the area of the edges formed by the intersection of the slide wedge cavity 116 and the front side 14. With these projections, also the slide wedge 92 can be held in place in the cage 110 before the cage is installed.

Figure 4:
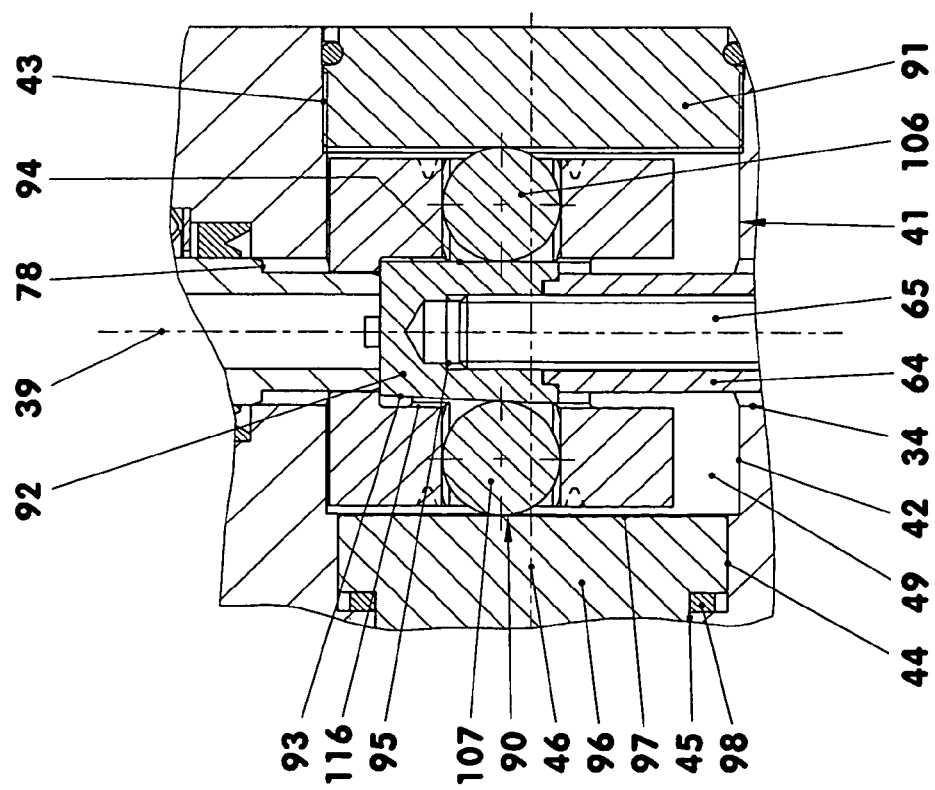
FIG. 4 shows a slide wedge drive with frictional a engagement mechanisms activated.

The slide wedge is a trapezoidal body with a rectangular cross-section which is variable in the longitudinal direction, that is, parallel to the center line 39, see FIG. 4 and which includes an essentially central threaded bore 95. The threaded bore shown herein is a dead end bore. The slide wedge 91 is rigidly connected by means of for example a screw 65 threaded into the threaded bore 95—see FIGS. 2, 4, 5—to a primary piston 63, which is supported in the spring storage bore 23. The slide wedge 92 includes among others a back up surface 94 and a wedge surface 93. Both surface areas are rectangular and for example planar. The wedge surface 93 facing the pressure member 96 extends thereto at an acute angle of 1 to 5 degrees. In the shown embodiment, the angle is 2.9 degrees. The back-up surface 94 extends parallel to the front face of the adjacent adjustment screw 91. For example, the cross-sections of the slide wedge 92 become smaller linearly with increasing distance from the piston rod end of the primary piston 63.

The primary piston 63 comprises a disc with a central bore and a circumferential groove including a seal ring. It is guided in the spring storage bore 23 which also forms the cylinder of the primary cylinder piston unit 60. Between the primary piston 63 and the cover 51 at least one spring element 52 is disposed which engages the bottom side of the primary piston 63 under tension. In FIGS. 1 and 3, spiral compression springs 52 are shown as spring elements. However in the interior of the spring 52 also a second spring with smaller diameter and for example an opposite pitch may be arranged. In this second spring, a third spiral compression spring may be positioned. Also, in place of the spring elements 52, a plate spring column, a plate spring packet or a combination of the two may be provided to form a spring store.

At the side of the slide wedge 92 remote from the primary piston 63, the hollow piston rod 73 of a secondary piston 71 is disposed. The latter is part of the second cylinder-piston unit 70 whose cylinder is formed by cylinder bore 77. The effective diameter of the secondary piston 71 is for example 90% of the effective primary piston diameter. The secondary piston 71 is provided at its bottom side with a recess 72, whose cross-section is somewhat greater than the cross-section of the piston rod 73.

Figure 11:
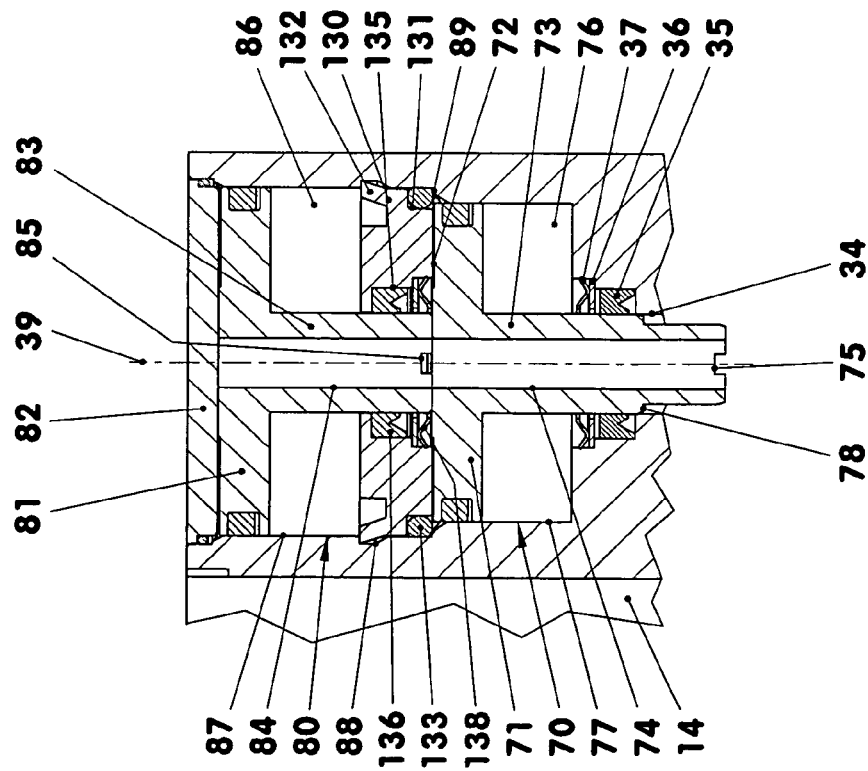
FIG. 11 shows part of FIG. 3 in an enlarged sectional view.

The piston rod 73 is here joined to the secondary piston 71. A central bore 74 provides for communication between the piston bottom side of the piston 71 and the open front area of the piston rod 73. The diameter of the through bore 74 as shown in FIG. 11 is for example 5 mm. The diameter corresponds about to one half of the outer diameter of the piston rod 83. The secondary piston rod 73 includes at the front face at least one transverse groove 75 whose cross-section is at least 2 mm$^2$. The front face may be provided with several such transverse grooves.

Opposite the wedge drive space 49, the pressure chamber 76 is sealed by a grooved seal ring 35 arranged in the connecting bore 34. The seal lips of the grooved seal ring 35 are oriented in the direction toward the wedge drive space 49. The grooved seal ring 35 is axially secured by a washer 36 in the connecting bore 34 which becomes larger in steps, toward the pressure chamber 76.

The pressure chamber 76 of the secondary cylinder-piston unit 70 is closed by a separation wall 130. The latter is disposed in a cylindrical bore 77 by means of a shoulder 89 formed by an adjacent cylindrical bore 87 of the tertiary cylinder-piston unit 80.

The separation wall 130 is essentially a disc with a central bore 135 through which the piston rod 83 of the tertiary cylinder-piston unit 80 extends. The separation wall has in its outer cylindrical surface a recess 131 forming a step which extends to the front side facing the pressure space 76. It also is provided with three or more engagement tongues 132 arranged in special cavities. The engagement tongues 132 project radially beyond the cylindrical outer surface by about 0.8 mm at an inclination angle of about 20° with respect to the center line 39.

The separation wall 130 abuts the shoulder 133 disposed in the recess 131. In this position, it is axially fixed by the engagement tongues 132 which are engaged in an annular groove 83 formed in the wall of the cylindrical bore 87.

The central bore 135 is provided with several steps so that its diameter increases in the direction toward the pressure space 76 in steps. The smaller diameter bore 135 is slightly larger than the outer diameter of the piston rod 83. In the middle step area, a groove ring 136 with two sealing lips is arranged wherein the inner sealing lip abuts the piston rod 83 whereas the outer sealing lip is in a static con-tact with the bore wall. The sealing lips are oriented toward the pressure space 76. In the third stepped area, a washer is disposed ahead of the groove ring 136 supported by a spreading spring ring 138.

The pressure chamber 86 of the tertiary cylinder piston unit 80 is closed by a screw lid 82. The tertiary piston 81 is of the same design as the secondary piston 71. Its piston rod 83 has a central through bore 84 which also extends through the piston 81. The diameter of the bore 74 corresponds to the diameter of the bore 84. The effective diameter of the tertiary piston 81 is comparable to that of the primary piston. Also, the tertiary piston rod 83 has at its front end at least one transverse groove 85. Its cross-section corresponds to that of the transverse groove 75.

All pistons have on their circumferential surface an annular groove in which at least one seal ring is accommodated. The piston bottom walls have, if they abut planar surfaces, at least radial grooves to permit inflowing pressure fluids to be rapidly effective on all the active piston surfaces. For minimizing, the piston masses, the piston may be provided at their face areas with recesses cut out from the piston face areas.

As an alternative to the joined piston rod 73, 83 of the pistons 71, 81, a single piston rod connecting the two pistons 71, 81 may be used onto which the pistons may be threaded via threads. It is also possible to manufacture the piston rod 83 with the secondary piston 71 in one piece to slide the separating wall 130 onto the piston rod and finally to shrink the tertiary piston 81 onto the piston rod.

Figure 12:
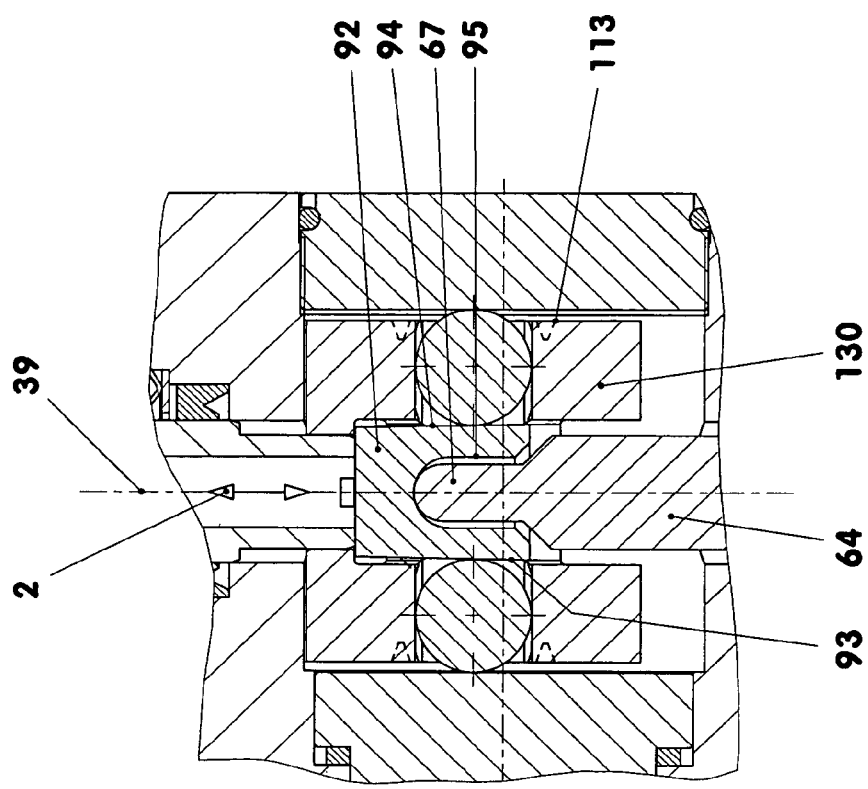
FIG. 12 shows a slide wedge drive with a symmetrical slide wedge.

FIG. 12 shows a slide wedge drive with a slide wedge 92, wherein the wedge surface 93 as well as the support surface 94 extend, with respect to the center line 39, at the same angle of for example 1.5°. With each stroke of the slide wedge 92, it is displaced also transverse to the center line 39. In order to accommodate this transverse movement, the slide wedge is supported separately from the piston rod 64. The slide wedge 92 has therefore a bore 95 with a spherical base. The piston rod 64 abuts that base with its end pin 67 whose free front end is spherically curved. With each stroke of the slide wedge 93, the piston 63 with the piston rod 64 is slightly tilted in the spring storage have as it rolls off on the spherical base of the bore 95.

Of course, the end pin 67 may also be omitted. In this case, the piston rod 64 abuts, with a now planar end face, the face of the slide wedge 92 which is also planar. During the longitudinal movement of the slide wedge 92, that is, during a movement in the longitudinal guide direction 2, the slide wedge 92 slides transversely along the planar front surface of the piston rod 64.

During assembly for each housing zone 11, 12, first the pressure member 96 with its return stroke ring 98 is inserted from the outer wall 19 at one side into the friction engagement mechanism bore 41. Then the cage 110 with cylinder rollers 106, 107 disposed therein and the slide wedge 92 is inserted into the bore 41. Subsequently, the bore 41 is closed by the adjustment lid 91.

In a second step, the primary piston 63 together with the piston rod 64 and the screw 65 are introduced into the spring storage bore 23 and from there into the connecting bore 34. As soon as the hollow piston rod 64 abuts the opening of the threaded bore 95 of the slide wedge 92, the parts are interconnected by the screw 65. Subsequently, the spring element 52 is placed into the spring storage bore 23. Then the spring storage bore 23 is closed by the cover 51.

In a third step, the secondary piston 71 is inserted into the cylindrical bore 77. In the process; the piston rod 73 extends through the grooved ring 35 and abuts the slide wedge 92. In a fourth step, the separation wall 130 is then moved into the cylindrical bore 87 until the engagement tongues 132 thereof snap into the annular groove 88, see FIG. 11.

In fifth step, the tertiary piston 81 is inserted into the cylinder base 87. The piston rod 83 of the tertiary piston 81 extends through the groove ring 136 of the separating wall 130 and into contact with the secondary piston 71. The cylinder bore 87 is then closed by the screw cover 82. With the transverse installation of the cage 110 only the connecting bore 34 is disposed between the friction engagement mechanism bore 41 and the adjacent spring storage bore 23 or respectively the cylindrical bore 77. Since the latter has a relatively small diameter, for example 11 mm, the housing 10 is particularly rigid in the housing zone 11, 12.

After the installation of the arrangement in a machine tool, the position of the pressure member 96 is finely tuned by rotation of the adjustment screw 91.

During normal operation, the arrangement is in the state as shown in FIG. 1. The spring element 52 or, respectively, the spring system of the spring storage drive 50 is tensioned. The slide wedge 92 is in its retracted position, see FIG. 5, so that the friction engagement mechanism is inoperative. The rolling bodies 106, 107 are disposed without play and essentially load-free in the cage 110. The return stroke ring 98 presses the pressure member 96 against the force of air pressure in the wedge drive space 49 in the direction toward the adjustment screw 91. The carriage 9 can freely move along the guide track 1.

To ensure this state, pressurized air is permanently supplied to the bottom sides of the secondary piston 71 and the tertiary piston 81, so that the secondary piston 71 is disposed with the shoulder 78 on the back side 112 of the cage 110, see FIG. 5. The cage 110 is supported by the wall of the friction engagement mechanism bore 41. The primary piston 63 which is engaged by the spring element 52 is subjected to a pressure force at the piston rod side thereof. As a result, the spring element is tensioned by the forces generated by all three pistons.

When now the air pressure required for holding the spring element 52 tensioned drops, the spring element 52 pushes the slide wedge 92 via the spring-loaded primary piston 63 into the friction engagement mechanism bore 41, see FIG. 4, independently of the presence of a system failure or whether a braking procedure is to be initiated or whether the carriage is to be locked or parked in a particular position. In the process, the slide wedge 92 moves the pistons (71, 81) via their piston rods 73, 83 to the side. In the engagement mechanism bore 41, the respective slide wedge 92 presses the respective pressure member 96 with increasing stroke of the slide wedge against the guide track 1. The outer cylinder roller 106 supports the slide wedge 92 on the adjustment screw 91 whereas the inner cylindrical roller 107 moves the pressure member 96 against the resistance of the return stroke ring 98 into the circumferential groove 14 and against the guide track 1. The cylindrical rollers 106, 107 roll along between the components 91, 92, 96 until a force equilibrium between the resiliency force of the housing 10 and the spring force of the spring element 52 is established. Then the two friction engagement mechanisms 90 have reached their maximum clamping force. The pressure members 96 then firmly abut the guide track 1.

In this position, see FIG. 4, the slide wedge 92 is disposed with its front surface which faces the secondary piston rod 73, at the end of the slide wedge cavity 116 of the cage 110. The cage 110 is always firmly guided in its movement between its end positions.

The spring storage bore 23 has a pressurized air supply passage 29, which is disposed ahead of the piston 63. When pressurized air is admitted to this bore 29, the braking or, respectively, clamping procedure is accelerated and the clamping force is increased. It is of course also possible to omit the spring element 52 or any mechanical spring system and rely solely on a pneumatic or hydraulic drive to operate the arrangement via the primary piston 63.

Reference List

| | |
|---|---|
| 1 | Double trapezoidal guide track |
| 2 | Guide direction, center line |
| 3 | Longitudinal center plane, vertical |
| 7 | Bottom surface |
| 8 | Machine bed |
| 9 | Carriage |
| 10 | Housing |
| 11 | Housing zone at right |
| 12 | Housing zone at left |
| 13 | Flange zone |
| 14 | Circumferential groove |
| 17 | Mounting bores for housing |
| 18 | Inner side wall |
| 19 | Outer side wall |
| 21 | Front surface facing spring |
| 22 | Front surface |
| 23 | Spring storage bore |
| 24 | Compression ring |
| 29 | Pressurized air supply passage |
| 34 | Connecting bore |
| 35 | Grooved ring |
| 36 | Washer |
| 37 | Spring ring |
| 39 | Center line |
| 41 | Friction engagement mechanism bore |

-continued

| | |
|---|---|
| 42 | Main bore |
| 43 | Fine thread |
| 44 | Pressure member guide bore |
| 45 | Outlet bore |
| 46 | Center line |
| 49 | Wedge drive space |
| 50 | Spring storage drive |
| 51 | Cover |
| 52 | Spring element |
| 60 | Cylinder piston unit |
| 63 | Primary piston |
| 64 | Piston rod |
| 65 | Screw |
| 67 | End pin |
| 70 | Cylinder piston unit secondary drive |
| 71 | Secondary piston |
| 72 | Recess |
| 73 | Secondary piston rod |
| 74 | Through bore |
| 75 | Transverse groove |
| 76 | Pressure space |
| 77 | Cylindrical bore |
| 78 | Shoulder |
| 80 | Tertiary cylinder piston unit |
| 81 | Tertiary piston |
| 82 | Screw lid |
| 83 | Piston rod |
| 84 | Central through bore |
| 85 | Transverse groove |
| 86 | Pressure chamber |
| 87 | Cylindrical bore |
| 88 | Annular groove |
| 89 | Shoulder |
| 90 | Friction engagement mechanism |
| 91 | Adjustment screw |
| 92 | Slide wedge |
| 93 | Wedge surface |
| 94 | Support surface |
| 95 | Thread |
| 96 | Pressure member |
| 97 | Front surface |
| 98 | Return stroke ring |
| 106 | Outer cylinder roller |
| 107 | Inner cylinder roller |
| 110 | Cage |
| 111 | Front side |
| 112 | Back side |
| 113 | Front side surface |
| 115 | Through channel |
| 116 | Slide wedge cavity |
| 117 | Transverse bore |
| 118 | Window |
| 119 | Longitudinal cage center plane |
| 121 | Support projection |
| 122 | Support recess |
| 130 | Separation wall |
| 131 | Recess |
| 132 | Engagement tongues |
| 133 | Seal ring |
| 135 | Central bore |
| 136 | Groove ring |
| 138 | Spreading spring ring |

What is claimed is:

1. A frictional engagement arrangement for a carriage (9) guided by a guide track (1), the arrangement comprising:
a housing (10) extending partially around the guide track (1) so as to have housing zones (11, 12) at opposite sides of the guide track (1),
multi-step bores (23, 34, 77, 87), each multi-step bore (23, 34, 77, 87) extending through a respective one of the housing zones (11, 12) along each side of the guide track (1),
transverse bores (41) extending across the housing zones (11, 12) at the opposite sides of the guide track (1) and intersecting the respective multi-step bores (23, 34, 77, 87),
slide wedge drives (92, 107, 96),
each slide wedge drive including a slide wedge cage (110) and a slide wedge member (92) disposed in each of the transverse bores with transverse housing wall sections extending across the multistep bores at opposite sides of each of the transverse bores (41), each of the transverse bores being sized so as to accommodate a respective one of the slide wedge cages (110) permitting installation of the slide wedge cages via the transverse bores (41),
frictional engagement mechanisms (90), each frictional engagement mechanism being arranged in a respective one of the multi-step bores (23, 34, 77, 78) extending through the housing zones (11, 12) at each side of the guide track (1), each frictional engagement mechanism including a pressure member (96) supported in the respective transverse bore (41) of the housing (10) so as to be movable into engagement with the guide track (1),
at least one of the slide wedge drives (92, 107, 96) including an operating mechanism comprising a spring storage device (50) with a spring-biased force application member (63) disposed in one of the multi-step bores (23, 34, 77, 87) for moving one of the wedge members (92) in one direction, thereby biasing one of the pressure members (96) into engagement with the guide track (1) and a hydraulically or pneumatically operated piston unit (71) for moving the one of the slide wedge members (92) in an opposite direction for the release of the one of the pressure members (96) from the guide track (1),
the piston unit (71) being disposed on a force-application piston rod (73) in one of the multi-step bores (23, 34, 77, 87) whose centerline (39) extends parallel to the longitudinal guide direction (2) of the guide track (1),
at least one rolling body (106) supporting each slide wedge member (92) disposed in each slide wedge cage (110) so as to be movable in the longitudinal guide direction (2), and
the transverse wall sections of the housing (10) extending through the multi-step bores at opposite sides of each of the transverse bores (41) and having openings (34) which are part of the multi-step bores (23, 34, 77, 87) and each opening has a diameter which is less than 30% of the diameter of a force application bore section (23) and is less than the outer diameter of the respective slide wedge cage (110) but larger than the diameter of the force application piston rod (73) for accommodating the force-application piston rod (73).

2. The arrangement according to claim 1, wherein, in each of the slide wedge cages (110), the slide wedge member (92) of the slide wedge drive (92, 107, 96) is engaged between a drive rod (64) of the spring storage drive (50) and the force application piston rod (73) of a pressurized fluid drive (70, 80).

3. The arrangement according to claim 2, wherein the spring storage drive (50) comprises a spring element (52) that is supported on the force application member (63).

4. The arrangement according to claim 2, wherein each of the slide wedge cages (110) is movable between two end positions and abuts in one end position the respective slide wedge member (92) and in the other end position the piston rod (73) of the pressurized fluid drive (70, 80).

5. The arrangement according to claim 1, further comprising an additional piston unit (81), wherein the piston unit (71) and the additional piston unit (81) each have a piston rod (73, 83), each of the piston units (71, 81) has a respective through bore (74, 84), the through bores (74, 84) being axially aligned.

6. The arrangement according to claim 5, wherein the piston rods (73, 83) of the piston units (71, 81) each have free ends which are provided with transverse grooves (75, 85) which intersect the respective through bores (74, 84).

7. The arrangement according to claim 1, wherein two friction engagement mechanisms (90) with slide wedge drives (92, 107, 96) for operating the friction engagement mechanisms are symmetrically arranged in the housing (10) with respect to a longitudinal center plane (3).

\* \* \* \* \*